United States Patent [19]

Beiter

[11] 4,072,883
[45] Feb. 7, 1978

[54] BI-DIRECTIONAL MOTOR DRIVE SERVO

[75] Inventor: Glenn A. Beiter, Louviers, Colo.

[73] Assignee: Honeywell Inc., Minneapolis, Minn.

[21] Appl. No.: 690,295

[22] Filed: May 26, 1976

[51] Int. Cl.² .................................................. G05B 11/28
[52] U.S. Cl. ............................................. 318/257; 318/6; 318/341; 318/599
[58] Field of Search ...................... 318/6, 257, 599, 341

[56] References Cited

U.S. PATENT DOCUMENTS

| 3,105,179 | 9/1963 | Young et al. | 318/6 |
| 3,260,912 | 7/1966 | Gregory | 318/599 X |
| 3,437,826 | 4/1969 | Kelley | 318/341 |
| 3,560,829 | 2/1971 | Brennan | 318/599 |
| 3,582,750 | 6/1971 | Halfhill | 318/599 |
| 3,719,878 | 3/1973 | Ferguson | 318/562 X |

Primary Examiner—B. Dobeck

Attorney, Agent, or Firm—Laurence J. Marhoefer; Lockwood D. Burton; Mitchell J. Halista

[57] ABSTRACT

A reel motor drive system using a first and a second signal for comparing an error signal derived from a tape tension sensing transducer with a respective polarity of separate positive and negative repetitive ramp signals. Each comparator produces an output signal as a series of constant frequency, duty cycle modulated pulses having a duration equal to the time that the error signal is greater than the ramp signal being compared thereto. These pulses are used as drive signals to a reel motor through a motor power amplifier and are used to develop mutually exclusive steering signals for selecting a motor drive direction by means of a steering logic circuit. The steering signals are also applied to the motor power amplifier to select a current path through the reel motor corresponding to the desired motor drive direction.

5 Claims, 4 Drawing Figures

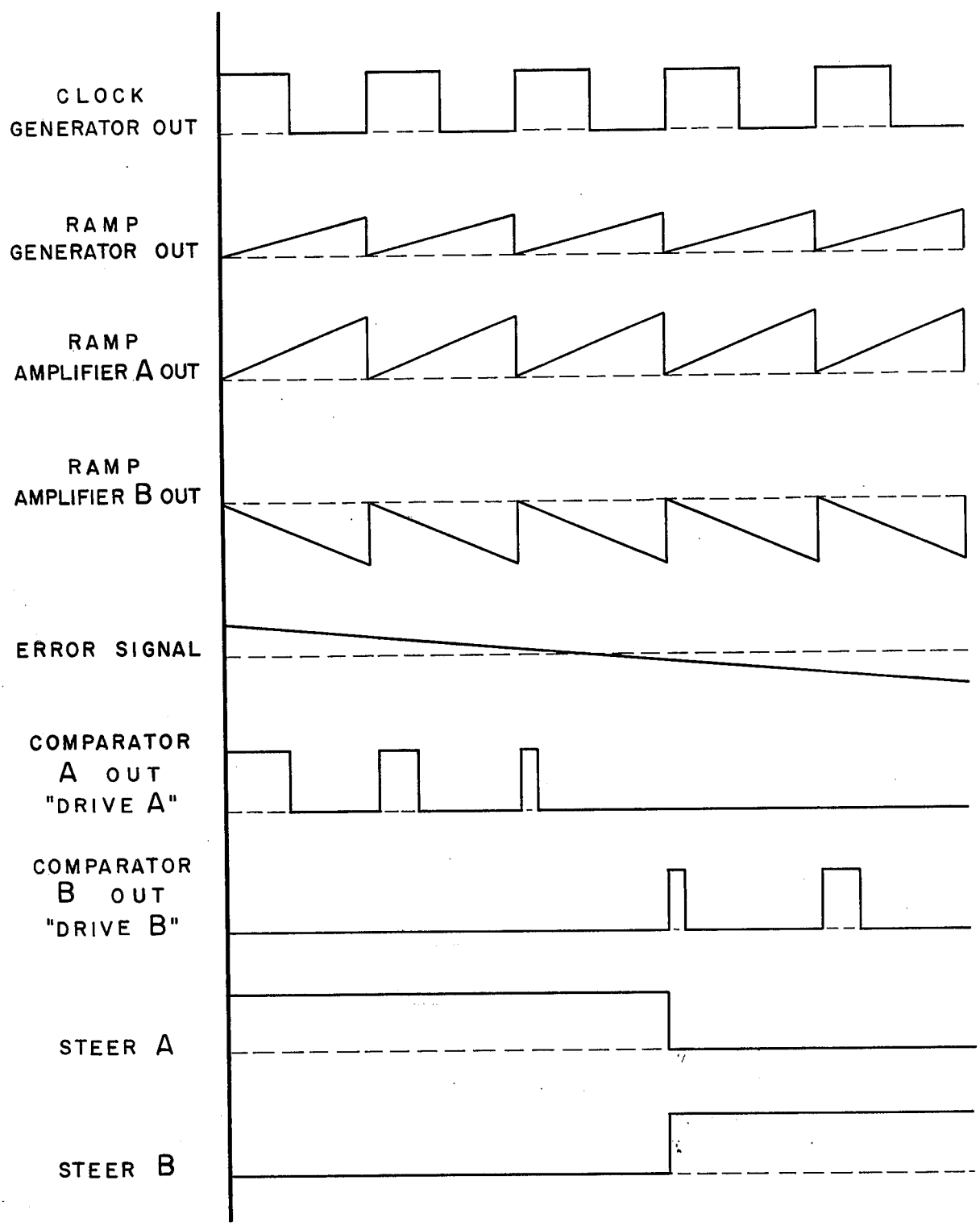
F I G. 2

BI-DIRECTIONAL MOTOR DRIVE SERVO

BACKGROUND OF THE INVENTION

1. Field of the Invention

The present invention is directed to a motor drive circuit. More specifically, the present invention relates to motor drive circuits for bi-directional servo systems.

2. Description of the Prior Art

Conventional pulse width modulated servo systems suffer principally from one of two problems when used as drive servo for reel motors in magnetic tape recorders. Specifically, they are normally single ended i.e., they can only apply drive signal to the reel motor in one direction which limits the size of the tape reels to be used and the rate at which the tape reels can be accelerated. Secondly, prior art pulse width modulated servo systems which are bi-directional have conventionally used a high frequency carrier and varied the pulse width of either the positive or the negative portion of the carrier dependent on the reel motor drive requirements. Thus, the frequency of the carrier changes inversely proportional to the load imposed on the reel motor. This varying frequency can cause severe noise problems in the tape recorder system and can interact with the data frequencies being recorded causing transients which are very difficult to identify and eliminate from the recorded information.

SUMMARY OF THE INVENTION

Accordingly, an object of the present invention is to provide an improved bi-directional reel motor drive servo system which uses a constant frequency motor drive signal. In accomplishing this and other objects, there has been provided herein, a motor drive system for operating a motor in a desired direction of rotation. A ramp signal generating means is arranged to produce a series of first polarity repetitive ramp signals and a series of a second polarity of repetitive ramp signals. A first and a second comparator means are each arranged to compare the respective polarities of the ramp signals with an error signal representative of a desired direction of motor rotation. The comparator means each produce a constant amplitude pulse for each ramp signal with each pulse having a duration equal to the time that the error signal has a higher amplitude than the compared respective polarity ramp signal. The output signals from the first and second comparators are applied to a signal steering logic circuit to develop a pair of mutually exclusive control signals and to a motor power amplifier means as determined by the control signals. The motor power amplifier means responds to the control signals and the comparator output signals to selectively apply power to a motor to produce a desired direction of rotation.

BRIEF DESCRIPTION OF THE DRAWINGS

A better understanding of the present invention may be had, when the following detailed description is read in connection with the accompanying drawings, in which:

FIG. 2 is a waveshape diagram showing representative waveshapes occurring during the operation of the system shown in FIG. 1.

DETAILED DESCRIPTION

Figure 1:
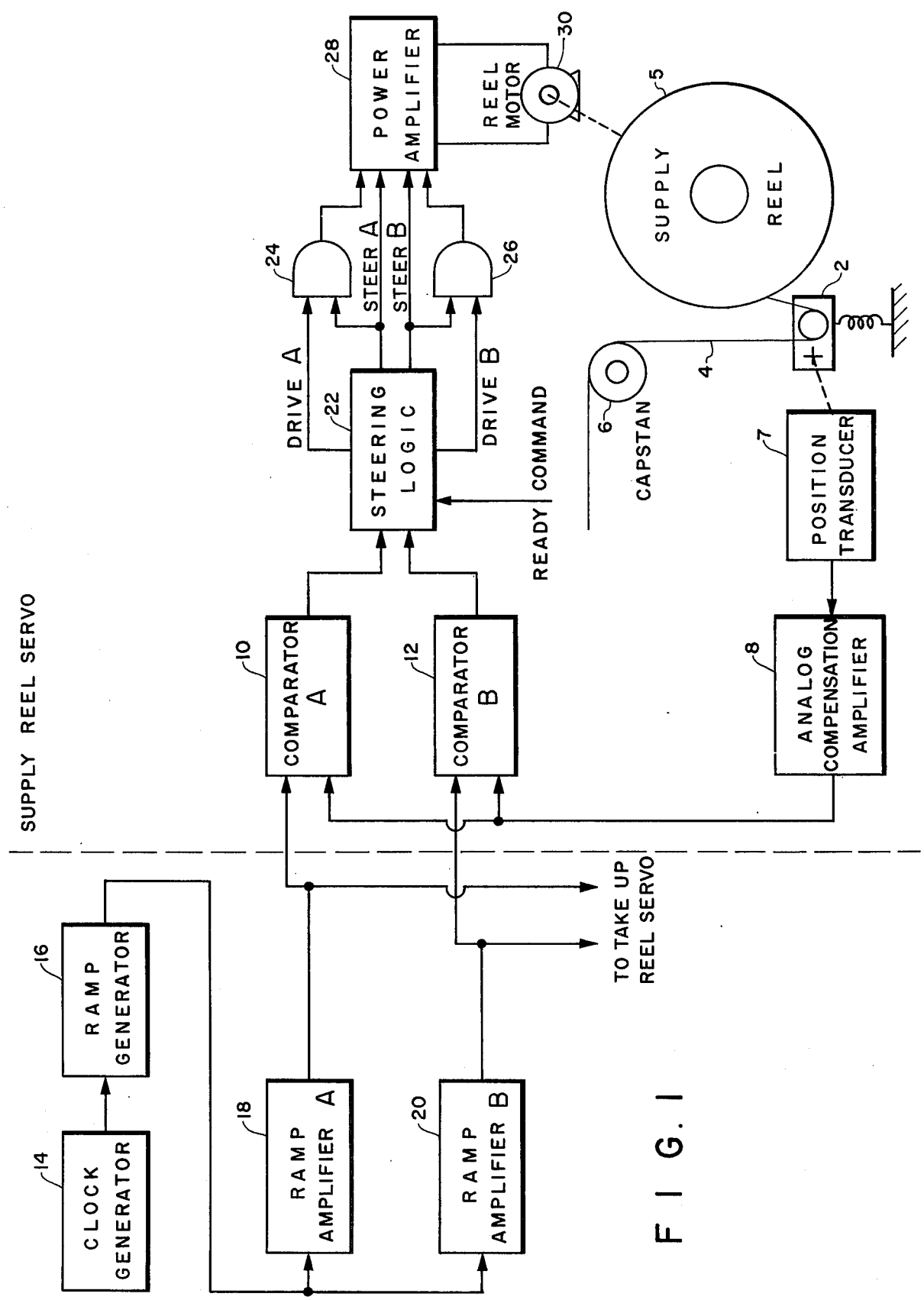
FIG. 1 is a block diagram of the motor drive circuit embodying the present invention.
Figure 3:
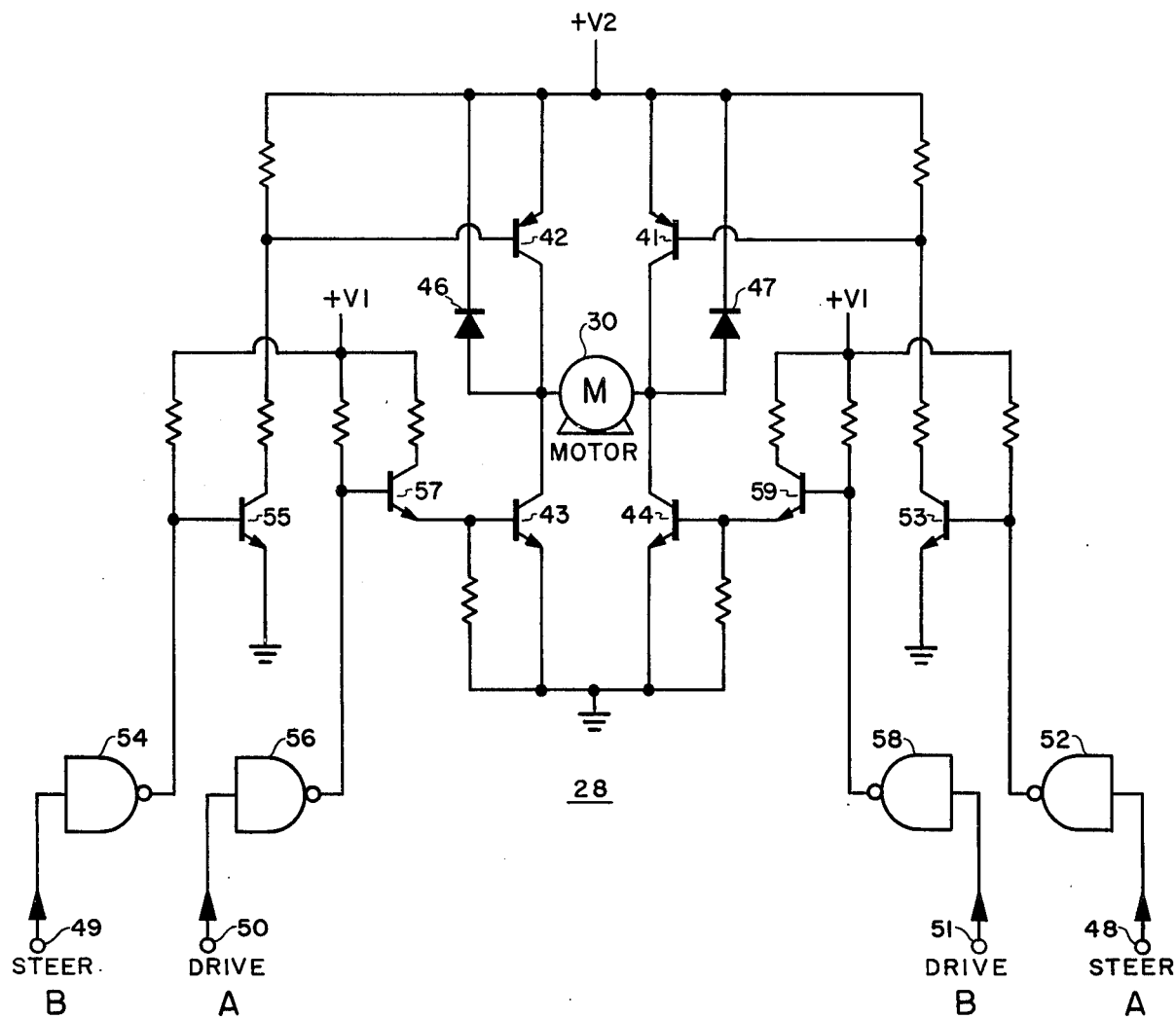
FIG. 3 is a schematic illustration of a power amplifier suitable for use with the system shown in FIG. 1.
Figure 4:
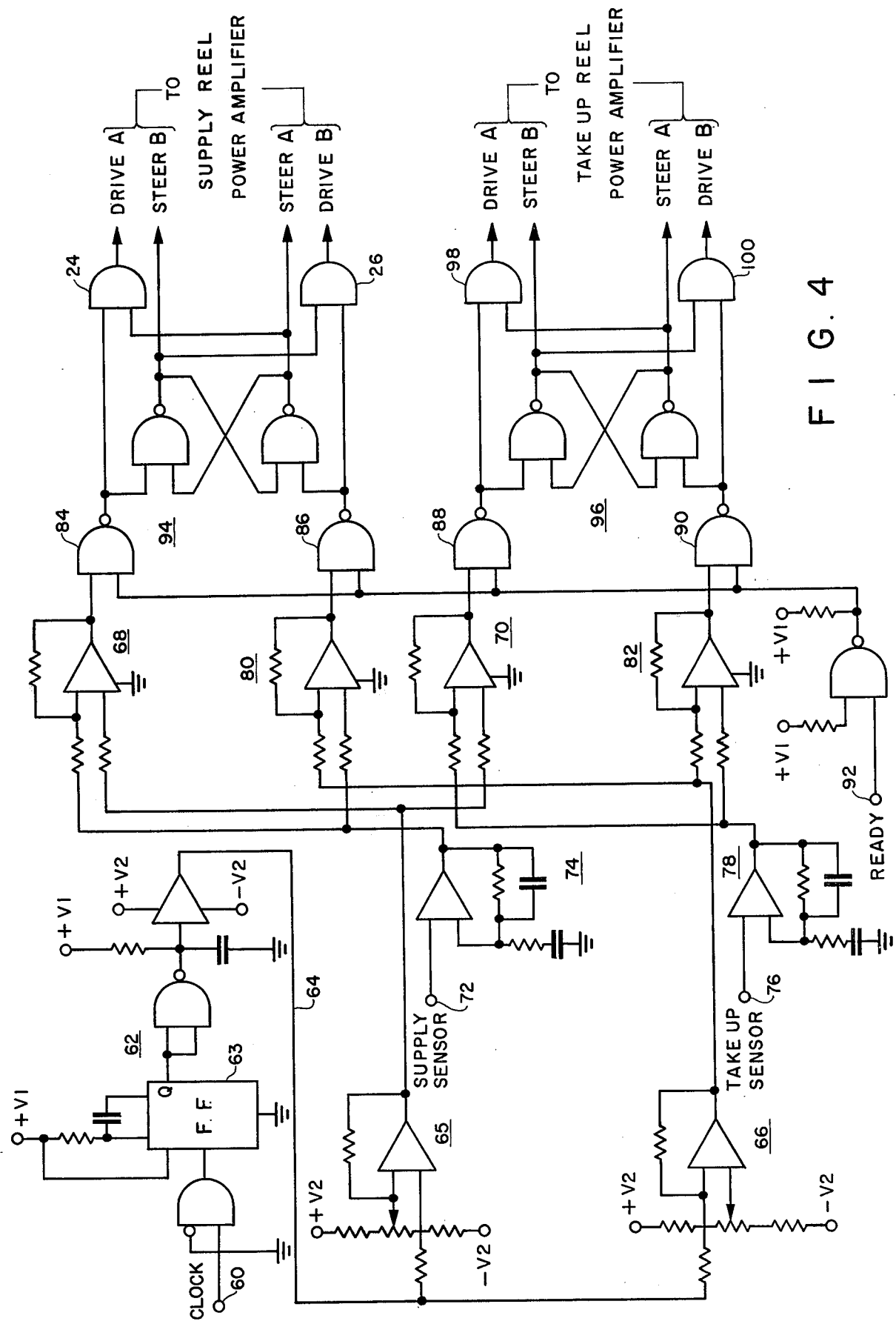
FIG. 4 is a schematic illustration of a preferred embodiment of the circuitry for the servo system controlling the power amplifier shown in FIG. 3.

Referring to FIG. 1 in more detail, there is shown a block diagram of a servo system embodying the present invention wherein the position of a tension arm mounted in contact with a recording tape 4 between a supply reel 5 and a tape drive capstan 6 is connected to a position transducer 7 for sensing the position of the tension arm 2. The output signal generated by the position transducer 7 is directly proportional to the position of the tension arm 2 and is applied to a compensation amplifier 8 having a signal transfer characteristic which is shaped to meet the necessary criteria for servo stability. The output of the compensation amplifier 8 is applied concurrently as a first input signal to each of a pair of signal comparators 10, 12. A clock generator 14 is used to generate a sequential digital timing signal which is applied to a ramp generator 16. The ramp generator output signal is a series of ramp signals and is applied concurrently to each of a pair of ramp signal amplifiers 18, 20. The ramp amplifiers 18, 20 each generate a series of ramp signals of a precise amplitude which are time related to each other and opposite inverted in polarity. The clock generator 14, the ramp generator 16 and the ramp amplifiers 18, 20 form a common circuit which is shared by both the supply and take-up reel motor servos. In FIG. 1, however, the illustration of the system has been simplified to show only the supply reel servo with the understanding that the take-up reel servo circuit is a substantial duplicate of the circuitry shown for the supply reel 5. Each of the comparators 10, 12 compares the voltage level of the error signal from the analog compensation amplifier 8 with the respective ramp signals from the ramp amplifiers 18, 20. Specifically, a first comparator 10 compares the error signal with a ramp signal from a first ramp amplifier 18 and a second comparator 12 compares the error signal with a ramp signal from the second ramp amplifier 20. The first comparator 10 generates a series of constant amplitude output pulses whose width, or duration, is equal to the period of time that the error signal is more positive than a ramp signal from the first ramp amplifier 18. The second comparator 12 generates a series of constant amplitude pulse output signals whose individual width, or duration, is equal to the period of time that the error signal is more negative than the ramp signal from the second ramp amplifier 20. Thus, a train of constant amplitude pulses are generated by each of the comparators depending on the compared polarity of the error signal. The width of each of the pulses is dependent upon the magnitude, or amplitude of the error signal above a zero level. The signals from the comparators 10 and 12 are applied to a steering logic 22 described more fully hereinafter. Concurrently, the output signal from each of the comparators 10, 12 is applied to a respective one of a pair of AND gates 24, 26 through the steering logic 22 as described hereinafter. Specifically, the output signal from the first comparator 10 is applied as a first input signal to a first AND gate 24 and an output signal from the second comparator 12 is applied as a first input signal to a second AND gate 26. In response to the comparator output signals the steering logic 22 is arranged to selectively produce one of a pair of output signals labeled "Steer A" and "Steer B." The Steer A signal is applied as a second input signal to the first AND gate 24 while the Steer B is applied as a second input signal to the second AND gate 26. A "ready" command signal is also applied to the steering logic 22 to selectively control the output signals from the comparators 10 and 12 if it is desired not to drive the motor 30 as during a tape loading operations. The output signals from the AND gates 24, 26 and the output pulses generated by the steering logic 22 are applied to a power amplifier circuit 28, also described more fully hereinafter. The output signal from the power amplifier circuit 28 is applied to the reel motor 30 of the supply reel 5 to drive the motor in the direction indicated by the control signals applied to the power amplifier 28. The detailed circuitry for the power amplifier is shown in FIG. 3 while the circuitry for the ramp generator, the ramp amplifiers, the comparators and the steering logic is shown in FIG. 4. The waveshapes occurring in the motor drive servo system are shown in FIG. 2 and are identified by legends corresponding to the identification of the system blocks shown in FIG. 1.

MODE OF OPERATION

While the following discussion is directed to the supply reel circuitry, it should be understood that the take-up reel circuitry operates in a similar manner with a sharing of the ramp generating circuits.

The drive system of the present invention provides constant frequency, bi-directional operation of the power amplifier 28 by converting the analog error signal from the tape position detector 6 to one of two possible digital output signals. These digitals output signals are of constant frequency while the duty cycle of the appropriate signal is varied to provide the necessary drive signal to the power amplifier 28 for controlling the corresponding reel motor 5. In other words, the servo system is a variable duty cycle servo system since in essence it selects one of two pulse trains dependent on the desired direction of reel drive and varies the duty cycle of the selected pulse train dependent on the load to be carried by the motor to be energized thereby. The overall object of the servo system is to maintain a constant tape tension in the tape recorder by maintaining the tension arm 2 at a constant position. Motion of the tape induced by a capstan motor (not shown) through a capstan drive roller 6 causes the tension arm 2 to change position which, in turn, results in the servo system driving the appropriate reel to either pay-out or take-up tape in an attempt to return to tension arm 2 to the correct position. In practice, the variation in tension arm position is relatively small, and the tape tension is maintained substantially constant.

As previously discussed, the comparators 10 and 12 compare the voltage level of the error signal from the compensation amplifier 8 with the ramp signal from either the first ramp amplifier 18 or the second ramp amplifier 20. Referring now to FIG. 2, there is shown an illustration of the waveshapes occurring in the servo system of FIG. 1. Thus, the first waveshape shown at the top of FIG. 2 is the output of the clock generator circuit 14. The second waveshape is the output of the ramp generator circuit 16. As may be seen from FIG. 1, the ramp signal is synchronized with the signal from the clock generator. The third waveshape is the output of the first ramp amplifier 18 and is synchronized with the output from the ramp generator although having a different amplitude. The fourth waveshape is the output signal from the second ramp amplifier 20 and while being synchronized with the output signal from the ramp generator 16 has an opposite polarity.

The error signal, the fifth waveshape in FIG. 2, is the output signal from the combination of the position transducer 7 with the compensation amplifier 8 and is shown an a slowly changing D.C. signal although in actual practice this signal may include low frequency A.C. components as well. The amplitude of the error signal is representative of the deviation in tension in the tape 4 from the desired tension and is produced by a movement of the tension arm 2 driving the position transducer 7. At the crossing of the zero axis of the error signal waveshape, the correct or desired tape tension is applied to the tape 4 while the deviation of the error signal on either side of the zero axis indicates either excess or insufficient tape tension, respectively. Inasmuch as the first comparator 10 is arranged to compare the ramp signal with the position error signal, the output signal from the first comparator 10 shown as the sixth waveshape is a series of constant amplitude pulses on the positive error side of the error signal from the zero crossing point. These output signal pulses have a variable duration, or duty cycle, dependent on the magnitude of the error signal. Thus, the output signals from the first comparator 10 are shown as a series of constant amplitude pulses having a pulse duration which is decreasing as the error signal is approaching the zero cross-over point. On the other hand, the output signal from the second comparator 12 is shown in the seventh waveshape of FIG. 2 as a series of constant amplitude pulses which have an increasing pulse duration as the error signal deviates away from the zero crossover point on the negative side of the error signal amplitude waveshape. In other words, the first comparator compares the error signal with the ramp signal from the first ramp amplifier 18 and generates a series of pulses when the error signal is more positive than the ramp signal from the first ramp amplifier 18. Conversely, the second comparator 12 generates a series of pulses whenever the error signal is more negative than the output signal from the second ramp amplifier 20.

The output signals from the first and second comparators 10 and 12 are applied to the steering logic 22 to develop the "Steer A" and "Steer B" signals. Further, the output signals from the comparators 10 and 12 are applied through the steering logic 22 to the AND gates 24 and 26, respectively. The "enable" signals for the first and second AND gates 24 and 26 are obtained from the "Steer A" and "Steer B" output signals of the steering logic 22 to control the transmission of the output signals from the comparators 10 and 12 through the AND gates 24 and 26, respectively. The steering logic 22 performs three major functions. First, it provides an output signal to control each of the AND gates 24 and 26 to prevent the application of simultaneous drive signals to the power amplifier 28. This control function prevents the application of spurious, i.e., noise, or component failure signals, being applied to the power amplifier 28 to produce an actuation of the reel motor 30. Secondly, the steering logic 22 provides an interface with a so-called "ready command" from the tape recorder's control system (not shown) and disables the reel motor drive when the tape recorder is being used for other purposes, e.g., loading tape. Third, the steering logic 22 generates the "Steer A" and "Steer B" control signals for the power amplifier 28.

Referring to FIG. 2, it may be seen that the Steer A command signal is present as a steady state signal level whenever the output signals from the first comparator 10 are being generated while the Steer B signal is present only when the output signals from the second comparator 12 are available. If the output signals from the comparators 10 and 12 are present simultaneously due to a transient noise signal or other error, a steering command signal will be generated corresponding to whichever drive signal from the comparators 10 and 12 persists for the longest period of time to continue the driving of the reel motor 30 in the direction represented by that drive command signal.

Referring now to FIG. 3, there is shown a schematic illustration of a power amplifier suitable for use as the power amplifier 28 of FIG. 1. The motor 30 is connected across a conventional bridge amplifier including four bridge transistors 41, 42, 43 and 44. The bridge circuit is connected to a source of energizing signal +V while a pair of diodes 46 and 47 are connected from respective sides of the motor 30 to the source of energizing potential +V to act as so-called "flywheel" diodes. Signals from the steering logic 22 shown in FIG. 1 are applied to corresponding ones of a pair of input terminals 48 and 49 labeled Steer A and Steer B, respectively. The output signals from the AND gates 24 and 26, shown in FIG. 1, are applied to corresponding ones of a pair of input terminals 50 and 51 labeled Drive A and Drive B, respectively. The input signal to the Steer A terminal 48 is applied through a logical inverter 52 to control a transistor amplifier 53. The output from the first transistor amplifier 53 is applied to control a first bridge transistor 41. The input signal from the Steer B terminal 49 is applied through a second logical inverter 54 to a second transistor amplifier 55. The output signal from the second transistor amplifier 55 is connected to control a second bridge transistors 42. The input signal to the Drive A terminal 50 is applied through a third logical inverter 56 to a third transducer amplifier 57 arranged as an emitter follower having an output connected to control a third bridge transistor 43. Finally, the input signal to the Drive B input terminal 51 is connected through a fourth logical inverter 58 to a fourth amplifier 59 arranged as an emitter follower to control a fourth bridge transistor 44.

Assuming the system is in the Drive A mode of operation, the Steer A command signal from the steering logic 22 will be effective to turn on the first transistor amplifier 53. This operating state of the third transistor amplifier 53 is effective to provide an output signal for turning on the first bridge transistor 41. The Drive A signal from the first comparator 10 is applied at this time through the AND gate 24 to the Drive A input terminal 50 and through the third logical inverter 56 and the third amplifier 57 to operate the third bridge transistor 43, i.e., the third bridge transistor 43 is turned on and off at the pulse rate of the signals from the second comparator 10. When the third bridge transistor 43 is in a conducting state, the current flows through the third bridge transistor 43, the motor 30 and the first bridge transistor 41 to drive the motor 30 in a first direction. When the direction of the drive of the motor 30 is to be reversed, the Steer A and Drive A signals are terminated and the Steer B and Drive B signals on input terminals 49 and 51, respectively, are applied. In this mode of operation, the bridge transistors 42 and 44 are activated to provide a similar mode of operation to that described above to drive the motor 30 in the opposite direction.

During the "of" portion of the drive cycle for the motor 30, a path for current flow through the motor 30 must be provided to dissipate the electromagnetic charge stored in the motor inductance. This is known as "flywheel" current; a flow path is provided for in the circuit shown in FIG. 3 by the diodes 46 and 47. For example, assume that the third bridge transistor 43 has been turned on and off by the Drive A signal applied to the Drive A input terminal 50. Since at this time, the Steer A command signal applied to the input terminal 48 is maintaining the first bridge transistor 41 in a conducting state, the "flywheel" current flows through the motor 30, the first diode 46 and the first bridge transistor 41 during the time that the third bridge transistor 43 is in a nonconducting state. The resistance of this flywheel current path is kept as low as possible since only the diode 46 and the saturated current conducting transistor 41 are in the current path whereby a high overall system efficiency is maintained. The second diode 47 is used in combination with the second bridge transistor 42 to provide a flywheel current path during the operation of the motor 30 in the opposite direction.

In FIG. 4, there is shown a detailed circuitry used for the ramp generator 16, the ramp amplifiers 18 and 20, the comparators 10 and 12 and the steering logic 22. In this circuit, the circuitry for both the supply and take-up reels is shown with the common ramp generator 16 and ramp amplifiers 18 and 20 being used to supply both the comparators 10 and 12 for the supply reel servo circuit and the take-up reel servo circuit. Further, the steering logic 22 is also shown for both take-up and supply reel circuits with a common "ready" command signal being used to inhibit both of the steering logic circuits. A clock input terminal 60 is provided for connection to the clock generator circuit 14. A conventional ramp generator circuit 62, used as the ramp generator 16 of FIG. 1, including a flip-flop 63 arranged as a stable multivibrator, produces a ramp signal on an output line 64. This ramp signal is applied to separate ramp amplifiers 65 and 66, used as the ramp amplifiers 18 and 20 of FIG. 1, which are shared by the supply reel servo circuit and take-up reel servo circuits. An output signal from a first ramp amplifier 65, which is used as the ramp amplifier 18 shown in FIG. 1, is applied to a pair of comparators 68 and 70, corresponding to comparators 10 and 12 of FIG. 1, to supply a first polarity, e.g., positive, ramp signal thereto. A first input terminal 72 is provided for connection to the output signal from the supply position transducer 7. The first input terminal 72 is connected to the input of a first compensation amplifier 74, which is used as the compensation amplifier 8 shown in FIG. 1. A second input terminal 76 is provided for connection to an output signal from a take-up reel position transducer (not shown). The second input terminal 76 is connected to a second compensation amplifier 78 which is used in a similar manner to the first compensation amplifier 74. The output signal from the first amplifier 74 is applied to a first comparator 68 and a second comparator 80 while an output signal from the second amplifier is applied to a third comparator 70 and a fourth comparator 82. The second ramp amplifier 66 is arranged to supply a second polarity, e.g., negative, ramp signal to the second and fourth comparators 80 and 82. The output signals from the comparators 68, 70, 80 and 82 are connected to a first input of respective ones of a plurality of NAND gates 84, 86, 88 and 90. A second input for each of the NAND gates 84, 86, 88 and 90 is obtained from a "ready" command input terminal 92 used as the "ready" command line shown in FIG. 1. Thus, the "ready" command signal is used to enable the NAND gates 84, 86, 88 and 90 to control the Drive A and Drive B output signals from the comparators as previously discussed. The output signals from a first and a second NAND gate 84 and 86 are applied to respective input sides of a first NAND gate flip-flop circuit 94. Concurrently, these NAND gate signals are applied as first input signals to respective ones of the AND gates 24 and 26. A second input signal for each of the AND gates 24 and 26 is obtained from a corresponding side of the first flip-flop 94. The NAND gates 84 and 86, the first flip-flop 94 and the AND gates 24 and 26 are connected in such a manner to allow only either a Steer A and Drive A pair of signals or a Steer B and Drive B pair of signals to be applied to the power amplifier 28 shown in FIGS. 1 and 3. Similarly, on the take-up servo side of the circuit shown in FIG. 4, the third and fourth NAND gates 88 and 90 are connected to a second NAND gate flip-flop 96 and a pair of AND gates 98 and 100 to produce a similar operation to that described above for the supply reel servo.

Accordingly, it may be seen that there has been provided, in accordance with the present invention, a bi-directional reel motor drive servo system using constant frequency motor drive signals.

The embodiments of the invention in which an exclusive property or privilege is claimed are defined as follows:

1. A motor drive system comprising
   signal generating means for producing a first polarity repetitive ramp signal and a second polarity repetitive ramp signal,
   error signal generating means for producing an output signal having a polarity representative of a desired motor drive direction,
   a first comparator means arranged to compare said output signal with said first ramp signal to produce a first constant amplitude motor drive signal pulse for each of said first ramp signals with a duration equal to the time during the rise time of said first ramp signal that said output signal is greater than said first ramp signal,
   a second comparator means arranged to compare said output signal with said secod ramp signal to produce a second constant amplitude motor drive signal pulse for each of said second ramp signals with a duration equal to the time during the rise time of said second ramp signal that said output signal is greater than said second ramp signal,
   signal steering logic means responsive to said first and second motor drive signals to produce one of a pair of mutually exclusive motor control signals for each motor drive signal and to gate one of said first and second motor drive signals in response to said one of said pair of motor control signals, and
   motor power amplifier means responsive to a gated one of said first and second drive signals and to said one of said pair of motor control signals to supply power to a motor to produce a motor drive operation in response thereto whereby the motor is driven in a direction determined by said motor control signals to produce a motor drive torque controlled by said motor drive signals.

2. A motor drive system as set forth in claim 1 wherein said signal generating means includes a clock signal generator, a ramp signal generator responsive to said clock signal to produce a series of ramp signals, a first amplifier means responsive to said ramp signals to produce said first polarity ramp signal and a second amplifier responsive to said ramp signals to produce said second polarity ramp signal.

3. A motor drive system as set forth in claim 1 wherein said signal steering logic includes a first AND gate, a second AND gate, first circuit means for applying said first motor drive signal and one of said control signals to said first AND gate and second circuit means for applying said second motor drive signal and the other one of said control signals to said second AND gate.

4. A motor drive system as set forth in claim 1 wherein said motor power amplifier means includes a first motor current path control means connected to the motor and a second motor current path control means connected to the motor, said first control means being responsive to said first drive signal and one of said control signals to apply power to the motor to produce a first direction of rotation of the motor and said second control means being responsive to said second drive signal and to the other one of said control signals to apply power to the motor to produce a second direction of rotation of the motor.

5. A motor drive system as set forth in claim 4 wherein said motor power amplifier means includes a bridge circuit, circuit means for connecting the motor thereacross, and said first control means includes a controllable current conducting means in a first and third arm of said bridge and said second control means includes a controllable current conducting means in a second and fourth arm of said bridge.

* * * * *